United States Patent [19]

Muller

[11] Patent Number: 4,559,592
[45] Date of Patent: Dec. 17, 1985

[54] ELECTRONIC POSTAGE METER HAVING A SWITCHING POWER SUPPLY EMPLOYING INTEGRATED CIRCUIT TIMER

[75] Inventor: Arno Muller, Westport, Conn.

[73] Assignee: Pitney Bowes Inc., Stamford, Conn.

[21] Appl. No.: 615,660

[22] Filed: May 31, 1984

[51] Int. Cl.[4] .......................................... H02M 3/335
[52] U.S. Cl. ........................................ 363/21; 363/97
[58] Field of Search ................ 363/21, 55, 56, 97, 363/131; 323/277

[56] References Cited

U.S. PATENT DOCUMENTS

| | | | |
|---|---|---|---|
| 3,659,189 | 4/1972 | Kiviranna | 323/277 |
| 3,978,457 | 8/1976 | Check, Jr. et al. | 340/172.5 |
| 4,077,413 | 3/1978 | Partridge | 363/37 |
| 4,253,138 | 2/1981 | Shelly et al. | 363/56 |
| 4,288,831 | 9/1981 | Dolikian | 363/26 |
| 4,301,507 | 11/1981 | Soderberg et al. | 364/464 |
| 4,316,242 | 2/1982 | Colangelo et al. | 363/21 |
| 4,318,168 | 3/1982 | Faxon | 363/21 |
| 4,326,244 | 4/1982 | Josephson | 363/21 |
| 4,400,767 | 8/1983 | Fenter | 363/21 |
| 4,459,651 | 7/1984 | Fenter | 363/21 |
| 4,460,951 | 7/1984 | Fenter et al. | 363/21 |

OTHER PUBLICATIONS

Gartner, Todd; Designer's Casebook, Electronics Aug. 22, 1974, p. 101.

Primary Examiner—Peter S. Wong
Assistant Examiner—Judson H. Jones
Attorney, Agent, or Firm—Joseph A. Sawyer, Jr.; William D. Soltow, Jr.; David E. Pitchenik

[57] ABSTRACT

A system is provided for energizing the meter accounting circuit. The postage meter is of the type having a mechanism for printing postage and accounting circuits which account for postage printed by the printing mechanism. A secure housing means encloses and protects the mechanism, the accounting circuit and the system for energizing the accounting circuit. A source of operating potential external to the secure housing is also provided. A transformer is connected with its primary winding coupled to the source of operating potential and to the first and second electrode current path of a three terminal switching device to control the current flow through said primary winding. A timer circuit is provided and includes a first terminal which oscillates at a frequency depending on the voltage applied to the timer circuit second terminal. The timer circuit first terminal is coupled to the control electrode of the three terminal control device. A feedback circuit is coupled between the transformer secondary winding and the timer circuit second terminal for varying the voltage applied to said timer circuit second terminal depending upon the voltage level developed in said transformer secondary winding.

13 Claims, 3 Drawing Figures

ELECTRONIC POSTAGE METER HAVING A SWITCHING POWER SUPPLY EMPLOYING INTEGRATED CIRCUIT TIMER

FIELD OF THE INVENTION

The present invention relates to electronic postage meter power supply systems, and more particularly, to electronic postage meter power supply systems employing a integrated circuit timer as part of the power supply control circuitry.

BACKGROUND OF THE INVENTION

Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter and is printed by the meter. As a result, postage meters must possess a high reliability to avoid the loss of user or government funds stored within the meter.

Electronic postage meters have been developed. Postage meter systems of this type are disclosed in U.S. Pat. No. 3,978,457 for MICROCOMPUTERIZED ELECTRONIC POSTAGE METER SYSTEM; and in U.S. Pat. No. 4,301,507 for ELECTRONIC POSTAGE METER HAVING PLURAL COMPUTING SYSTEM. Such meters may have electronic accounting circuits which include non-volatile memory capability for storing postage accounting information. The memory function in these electronic accounting circuits have replaced the function served in mechanical postage meters by mechanical accounting registers. The non-volatile memory and value selection in the electronic postage meters of the aforementioned patents, as well as other meter functions, may be operated under microcomputer control.

Mechanical postage meters are not subject to many of the problems encountered by electronic postage meters. Conditions cannot normally occur in mechanical postage meters, with mechanical registers, that prevent, for example, accounting for a printing cycle, improper control of the meter, or which will result in the loss of data stored in the mechanical registers. This is not the case with electronic postage meters. Critical components of electronic postage meters are subject, for example, to the effects of electromagnetic radiation and heat generated within the meter, which can effect their proper operation. Thus, precautions must be taken, as for example by proper shielding and heat reduction or dissipation, to protect the meters electronic components. Mechanical security must, of course, also be provided.

It has been recognized that it is desirable to energize electronic postage meters in a manner which eliminates or minimizes the problems associated with electromagnetic radiation. For example, a power supply system wherein only the secondary winding is within the meter secure structure is disclosed in U.S. patent application Ser. No. 344,651, filed Feb. 1, 1982, by Frank T. Check, Jr. for ELECTRONIC POSTAGE METER HAVING POWER MAGNETICALLY COUPLED TO THE METER FROM THE METER BASE. Also, the need for efficient power supplies in electronic postage meters is noted in U.S. patent application Ser. No. 306,805, filed Sept. 29, 1981, by Roland G. Miller for POWER SUPPLY SYSTEM. Further, it has been discovered that isolating high power supply system can be incorporated within the electronic postage meter itself in a manner which will provide isolation from the effects of electromagnetic radiation and the effects of both over voltage and under voltage at the input terminals to the power supply. This is achieved without having opto-coupler feedback from the secondary winding circuit to the primary winding circuit, while still retaining the necessary isolation between such windings. These discoveries are disclosed in U.S. patent application Ser. No. 506,957 filed June 23, 1983, by Arno Muller for ELECTRONIC POSTAGE METER HAVING A REGULATED POWER SUPPLY SYSTEM RESPONSIVE TO A VOLTAGE DEVELOPED IN A TRANSFORMER PRIMARY WINDING CIRCUIT. All three patent applications are assigned to Pitney Bowes Inc.

Power for the controller of many switching power supplies is often derived from the raw DC input to the power supply. However, because of the nature of regulated switching power supply circuits, many of the inputs to the controller come from the output of the supply which is the controlled variable. If it is specified, as it often is in electronic postage meters, that the output be isolated from the input, feedback becomes complicated. The situation, for such devices, becomes even more difficult if it is specified that the power supply operate over a wide range of input voltages. Moreover, the situation is further complicated when the circuit is required such as in postage meters to provide a linear feedback under a wide range of operating conditions and through years of life. Additionally, when using typical switching power supply control devices for the power supply in electronic postage meters, the circuitry may include unnecessary features such as a voltage reference, operational amplifiers, comparators, pulse width modulators, etc. thereby needlessly adding to the cost of the meter.

SUMMARY OF THE INVENTION

It has been discovered that a fly back type switching power supply suitable for use in electronic postage meters can be fabricated using low cost type integrated circuit timers devices as part of the power supply control system. This provides the benefit of the use of a low cost component in a mass produced product.

The circuit configuration of the present invention provides isolation between the input and the output, current limiting and the capability to supply a regulated output voltage over a wide range of input voltage. These characteristics are important in fabricating power supplies for use in electronic postage meters.

In accordance with the present invention a switching power supply circuit arrangement is provided with isolation between input and output and which employs low cost components. The power supply is a fly back type supply suitable for small, compact, low power output supply applications, such as electronic postage meters.

It has been discovered that the apparent drawback of fly back power supplies of switching relatively large currents and thus requiring relatively large capacitors, can be beneficially employed in accordance with the present invention to make it easier to eliminate linear feedback devices between the input and output circuit of the supply and use on/off type switching feedback. In accordance with a feature of the present invention a comparator is provided with a zener diode for voltage reference to monitor the output voltage from the power supply and for driving a light emitting diode of an optocoupler whenever the output exceeds the desired voltage level. The opto-coupler provides isolation between the output and input in the feedback path. The output of the opto-coupler is connected to the trigger and threshold inputs of a integrated circuit timer device in such a way as to turn the device output off when the output voltage exceeds the desired level. In the absence of the turn off signal from the opto-coupler, the integrated circuit timer operates in a bistable mode at a frequency proportional to the input voltage. The output of the timer controls a switching transistor which powers the primary winding of the switching power supply transformer.

In accordance with a feature of the present invention the transformer provides isolation between the input and output in the forward energy transfer path and a resistor in series with the transformer primary winding provides a voltage signal which is proportional to the current. This signal is applied through a transistor to the reset pin of the timer integrated circuit so as to turn it off. Thus, the power supply has current limiting capability. Power for the control circuit of the supply is provided initially by the input voltage. However, when the power supply starts to operate, a rectifier connected between the transformer primary winding and the power transistor provides a voltage which approximately (neglecting the effects of switching transients) is the sum of the input and output voltages. This allows the power supply to continue operating when the input voltage drops below the level required by the controller of the power supply circuit.

In an electronic postage meter having means for printing postage and accounting means for accounting for postage printed by the printing means, secure housing means for protecting the printing means and the accounting means, a source of operating potential external to the secure housing means, a system for energizing the accounting means mounted within the secured housing embodying the present invention includes a transformer having a primary winding and a secondary winding, the primary winding is coupled to the source of operating potential. The first and second electrode current path of a three terminal switching device is coupled to the primary winding of the transformer to control the current flow through the primary winding. A timer circuit is provided having a first terminal means and second terminal means. The timer first terminal means is adapted to oscillate at a frequency depending on the voltage applied to the timer circuit second terminal means. The timer circuit first terminal means is coupled to the three terminal control device control electrode. A feedback circuit means is coupled between the transformer secondary winding and the timer circuit second terminal means for varying the voltage applied to the timer circuit second terminal means depending upon the voltage level developed in the transformer secondary winding.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DESCRIPTION OF THE PREFERRED EMBODIMENT

Figure 1:
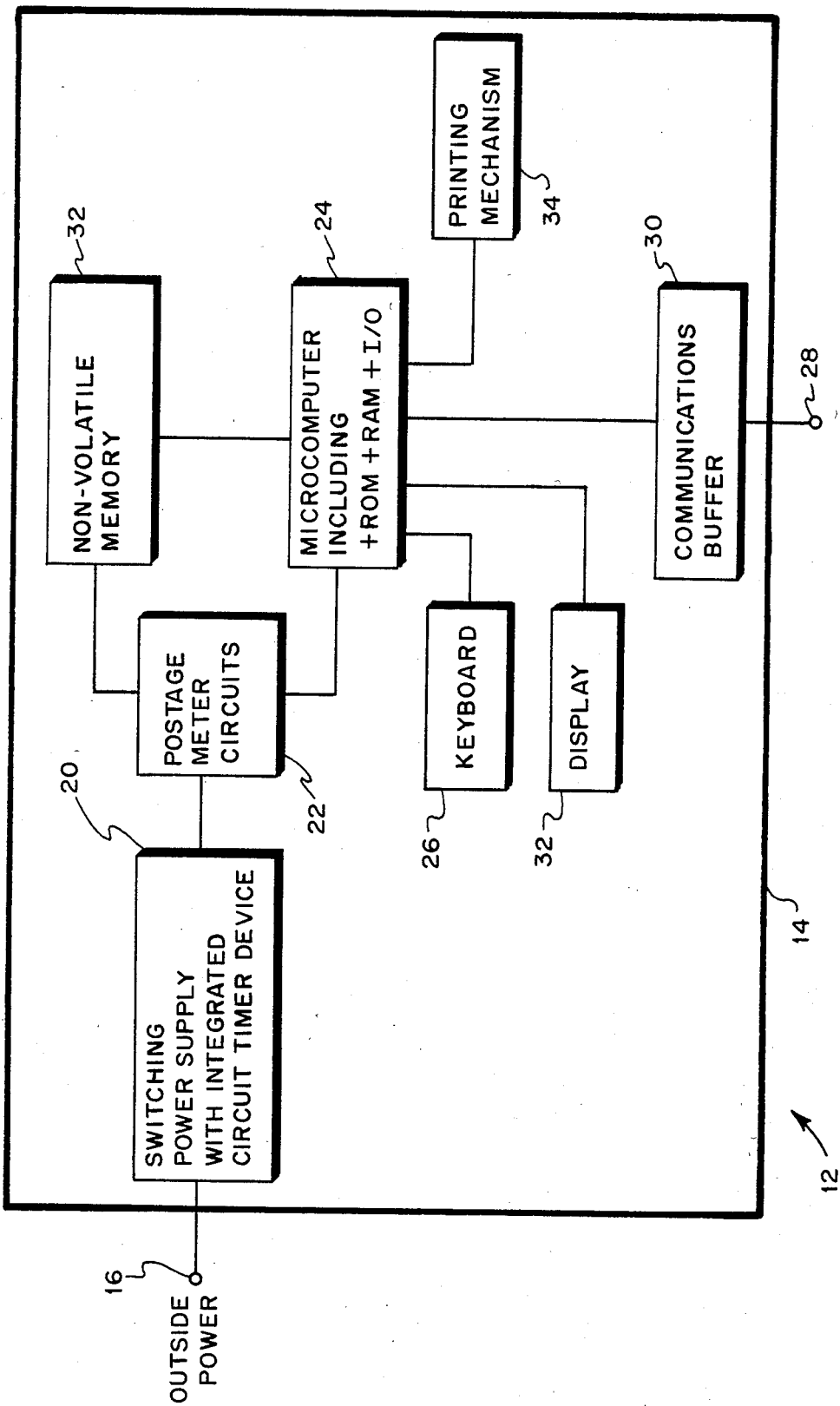
FIG. 1 is a block diagram of an electronic postage meter having an isolating switching power system embodying the present invention.

Reference is now made to FIG. 1. A postage meter 12 includes a secure housing 14 for providing physical security for the meter. The housing may also provide electro-magnetic shielding for the meter components. Power is supplied to the meter via a terminal 16. Terminal 16 is energized with +36 volts DC. This DC voltage may be generated from a power supply outside the secure meter housing. This power supply may, in turn, be energized by a source of 60 hertz, 115 volt AC, or other suitable source of available operating power.

Terminal 16 is coupled to an isolating switching power supply 20. The power supply 20 includes a low cost integrated circuit timer device which is discussed in greater detail hereinafter. The isolating switching power supply 20 is coupled to the postage meter control and logic circuits 22.

The postage meter control and logic circuits are coupled to energize and control the postage meter microcomputer system 24. The microcomputer system 24 includes a microcomputer and related circuitry, usually, random access memory (RAM), read only memory (ROM), associated input/output (I/O) buffers and timing circuits. The program resident in the ROM controls the sequence of operation of the microcomputer, and hence, the operation of the meter. It should be noted that suitable postage meter operating programs are disclosed in detail including flow charts and program listings in the above-noted U.S. Pat. No. 3,978,457 for MICROCOMPUTERIZED ELECTRONIC POSTAGE METER SYSTEM and U.S. Pat. No. 4,301,507 for ELECTRONIC POSTAGE METER HAVING PLURAL COMPUTING SYSTEMS.

Data may be entered into the postage meter via a keyboard 26 coupled to the microcomputer system 24. Alternatively, data may be entered into the meter through a communications port 28 coupled via an isolating communications buffer 30 to the microcomputer system 24. A display 32 coupled to the microcomputer system 24 may also be provided. The display provides a visual indication of data entered into the meter and/or the status of various accounting registers resident in the meter memory components.

A printing mechanism 34 is coupled to the microcomputer 24. The printing mechanism is adapted to print the unit value impression on a mail piece. A suitable printing mechanism for an electronic postage meter is shown in U.S. Pat. No. 4,287,825 for PRINTING CONTROL SYSTEM.

Figure 2:
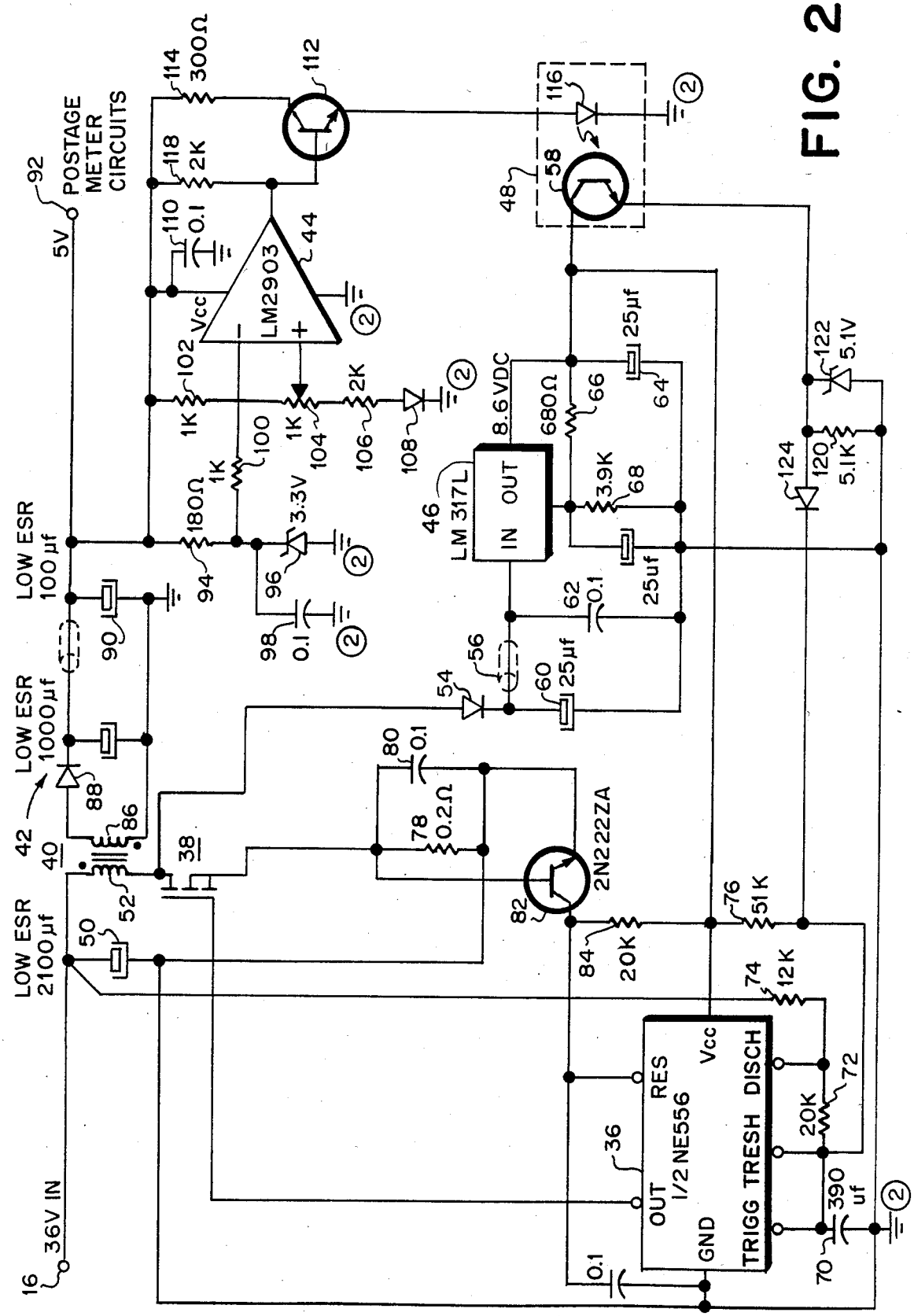
FIG. 2 is a schematic circuit diagram of the isolating switching power supply system for the electronic postage shown in FIG. 1.

Reference is now made to FIG. 2. Broadly, a switching power supply is built around a low cost common integrated circuit timer device 36, such as a Signetics type NE556 timer. Since these devices normally include two units per integrated circuit, one half is designated on the drawing to indicate only one of the two units is employed in the circuit. The timer device 36 operates in conjunction with a MOS switching transistor 38 and a transformer 40 to provide energy to the secondary winding rectifier circuit 42. The rectifier circuits 42 provide an isolated regulated DC voltage to the postage meter circuits 22. A feedback network incorporating a comparator amplifier 44, a three terminal regulator 46 and an opto-coupler 48 are provided. The opto-coupler 48 provides a signal to the timer device 36 (the voltage level of which is regulated by the regulator 46) to turn the timer device on and off depending on the voltage level input to the comparator 44. It should be noted that the ground from the primary circuit is isolated from the ground from the secondary circuit. Thus, the ground for the primary circuit is shown as ground 1 while the ground for the secondary circuit is shown as ground 2. This is provided to prevent undesired interaction between the primary and secondary circuits which would compromise the isolation between these two circuits.

In operation, a 36 volt DC unregulated input is applied to terminal 16 and to electrolytic capacitor 50. The device has a low equivalent series resistance to provide low impedance to the switching power supply. One suitable device is Sprague Electric Co., catalog number 622D282M055AA2A, 2800 UF, 55 VDCW Electrolytic Capacitor. The capacitor 50 provides power for the meter components for a predetermined period of time should the external source of operating power at terminal 16 be interrupted. The energy stored in the energy storage device 50 is sufficient to allow meter operations in progress to be completed and for critical accounting data, such as the amount of postage printed, the value of the descending meter register or the value of the ascending meter register, to be transferred from operating to nonvolatile memory. The critical nature of these registers is described in the above noted U.S. Patents and applications.

Once the electrolytic capacitor 50 is charged, a voltage is applied to the primary winding 52 of the transformer 40. The voltage at terminal 16 is also applied through the primary winding 52 of transformer 40 to regulator 46 via a diode 54. A ferrite bead 56 may be provided on the wiring to reduce noise and transients at the input of the regulator 46.

The regulator 46 through its output terminal applies a regulated 8.6 volts DC to the timer device 36 to energize the device. The 8.6 volts DC is also applied to the collector electrode of the phototransistor 58 of the opto-isolator 48. Capacitors 60 and 62 provide filtering of the input voltage to the regulator 46, while capacitor 64 provides filtering for the output of the regulator 46. A resistor voltage divider and feedback network including resistors 66 and 68 establish the level of the regulator 46 output voltage. The regulator 46 may be a National Semiconductor type LM317L regulator device.

With the timer device 36 thus energized at its terminal $V_{cc}$, it begins to oscillate at a frequency determined primarily by the value of capacitor 70 and the resistor network including resistors 72, 74, and 76. These components establish the trigger and threshold terminal voltage levels and these two inputs to the timer device 36 determine when the device 36 turns on (THRESH) and when the device 36 turns off (TRIGG). The discharge terminal (DISCH) turns on and off in unison with the timer device 36 output terminal (OUT). Thus, when the timer device 36 output is off or high, the discharge terminal is likewise off or high. Thus, the capacitor 70 charges through the high impedance series resistance of resistor 72 and 74 from the DC voltage applied at terminal 16. When the timer turns on and the timer device output terminal goes low or to ground potential the discharge terminal likewise simultaneously turns on and goes to ground potential. This provides a low impedance discharge path for the capacitor 70 through the resistor 72 and the discharge terminal of the timer device 36 to ground. The trigger and threshold terminals operate such that as the voltage across the capacitor 70 builds up to two-thirds of the voltage at the timer device 36 terminal $V_{cc}$, the voltage at both the output and discharge terminals of the timer device 36 are connected to ground. At this time the capacitor 70 discharges through the resistor 72 and the discharge terminal of the timer device 36. When the voltage across the capacitor reaches one-third the voltage at the timer device terminal $V_{cc}$, the trigger terminal turns the discharge path off and the voltage at both the output and the discharge terminals of the timer device 36 go high. At this time, the capacitor 70 again begins to be charged through the series connected resistors 72 and 74 from the voltage applied at the input terminal 16. In this manner, the timer device 36 is caused to oscillate. Of course, the frequency of the oscillation of the timer device 36 is dependent on the rate at which the capacitor 70 is charged and discharged. The register 74 may be connected to the $V_{cc}$ terminal of the timer device 36. Since that terminal is supplied with a regulated voltage the oscillation frequency and therefor the on time of the primary will be constant. Unfortunately constant on time means that as the input voltage rises the peak currents rise. Therefore it is desirable to reduce the on time at higher input voltages. This is accomplished by connecting register 74 to the input terminal 16. Thus, the higher the voltage at the input terminal 16 the quicker the capacitor 70 will be charged and the higher the frequency of oscillation of the timer device.

As the timer device output is turned off (high) the MOS switching transistor 38 is biased into conduction. As a result, current flows from the terminal 16 through the primary winding 52 of transformer 40, the source-drain electrodes of the MOS transistor 38 and resistor 78 to ground. Capacitor 80 is provided to filter transients which may occur when the transistor 38 is turned on and off.

If the current through resistor 78 exceeds a predetermined level, here, approximately in the order of 3½ amps, transistor 82 is biased into conduction which connects the reset terminal of timer device 36 through the collector-emitter electrode current path of the transistor 82 to ground. This resets the timer device causing the output terminal of the timer device 36 to go low turning MOS switching transistor 38 off. In normal operation transistor 82 is biased out of conduction and the switching of the output terminal of the timer device 36 is controlled by the voltage developed across capacitor 70. The resistor 78 in conjunction with transistor 82 as interconnected with the timer device 36 provides current limiting and over current protection to the system. Resistor 84 provides a positive bias for the timer device reset pin when the transistor 82 is biased out of conduction.

When quiescent operation has been established, transistor 38 is switched on and off as determined by the timer device 36 output terminal. This causes the transformer primary winding 52 to be switched on and off. This, in standard fashion establishes an alternating voltage across the secondary winding 86 of the transformer 40. The voltage across the transformer secondary winding 86 is rectified by a diode 88 and filtered by capacitors 88 and 90. This establishes a regulated 5 volt DC output at terminal 92 for application to the postage meter circuits 22.

A reference voltage for application to the comparator amplifier 44 is established across the combination of a resistor 94, zener diode 96 and capacitor 98. The reference voltage at the junction of the resistor 94 and zener diode 96 is supplied via resistor 100 to the comparator amplifier 44. The comparator amplifier 44 may be a National Semiconductor type LM2903 comparator amplifier. A sample of the output voltage is also applied to the comparator amplifier 44. This voltage is established across the series connected resistor 102, potentiometer 104, resistor 106 and diode 108 connected between the output terminal 92 and ground. The comparator amplifier 44 is coupled to the tap connection of the potentiometer 104. The diode 108 provides temperature compensation to match the temperature characteristics of the zener diode 96. A small filter capacitor 110 is provided at the $V_{cc}$ terminal for the comparator 44 to filter transients.

The output of the comparator amplifier 44 is turned off depending upon the comparison of the sampled output voltage at terminal 92 and the reference voltage developed across the zener diode 96. If the voltage at terminal 92 goes high exceeding +5 volts, the output of the comparator amplifier goes high biasing transistor 112 into conduction. This allows current to flow through resistor 114 and the collector-emitter current path of transistor 112 to energize light emitting diode 116 of opto-coupler 48. If the output voltage at terminal 92 is less than +5 volts, the output from the comparator amplifier 44 is low and transistor 112 is biased out of conduction which grounds the base electrode of the transistor 112 through the comparator amplifier 44. At this time, current flows through the resistor 118 and the comparator amplifier device 44 to ground.

When the voltage at terminal 92 is above +5 volts and the light emitting diode 116 is energized, phototransistor 58 is biased into conduction. This causes a voltage to be established across the parallel connected resistor 120 and zener diode 122 which is applied through diode 124 to the trigger and threshold terminals of the timer device 36. As a result the voltage across capacitor 70 is prevented from dropping below one-third of the $V_{cc}$ voltage level. Thus, the oscillation of the device 36 is blocked and the transistor 38 is biased out of conduction because the output terminal from timer device 36 is maintained low at ground potential. This condition is maintained so long as the voltage at terminal 92 is above +5 volts and light emitting diode 116 is biased into conduction. When the voltage drops to +5 volts the transistor 112 is biased out of conduction, and light emitting diode 116 is likewise biased out of conduction. This in turn biases phototransistor 58 out of conduction and no voltage is developed across zener diode 122. The timer device 36 resumes oscillation as previously described. The oscillations continue until the voltage at terminal 92 again exceed +5 volts when the cycle is repeated.

It should be noted that if the feedback network is disconnected, that is diode 124 disconnected from the trigger and threshold terminals of the timer device, the voltage at the output terminal 92 would be significantly above +5 volts because of the high frequency of oscillation of the timer device 36.

With the configuration shown, a regulated +5 volt DC output can be obtained at terminal 92 even when the voltage at terminal 36 drops below +5 volts. This is because the voltage developed across the secondary winding 86 of transformer 40 is reflected back into the primary winding 52 when transistor 38 is biased out of conduction. When this occurs, the collapsing magnetic flux induces a voltage in the secondary winding 86 as well as inducing a proportional voltage in the primary winding 52 of transformer 40. This voltage raises the voltage at the anode of diode 54 above the input voltage at terminal 16. As a consequence, the regulator 46 continues to operate after the input voltage at terminal 16 has dropped below the rated voltage required to maintain regulator 46 in proper operation. This extends the range over which the switching regulator system of the present invention can provide a regulated output voltage of +5 volts at terminal 92.

Figure 3:
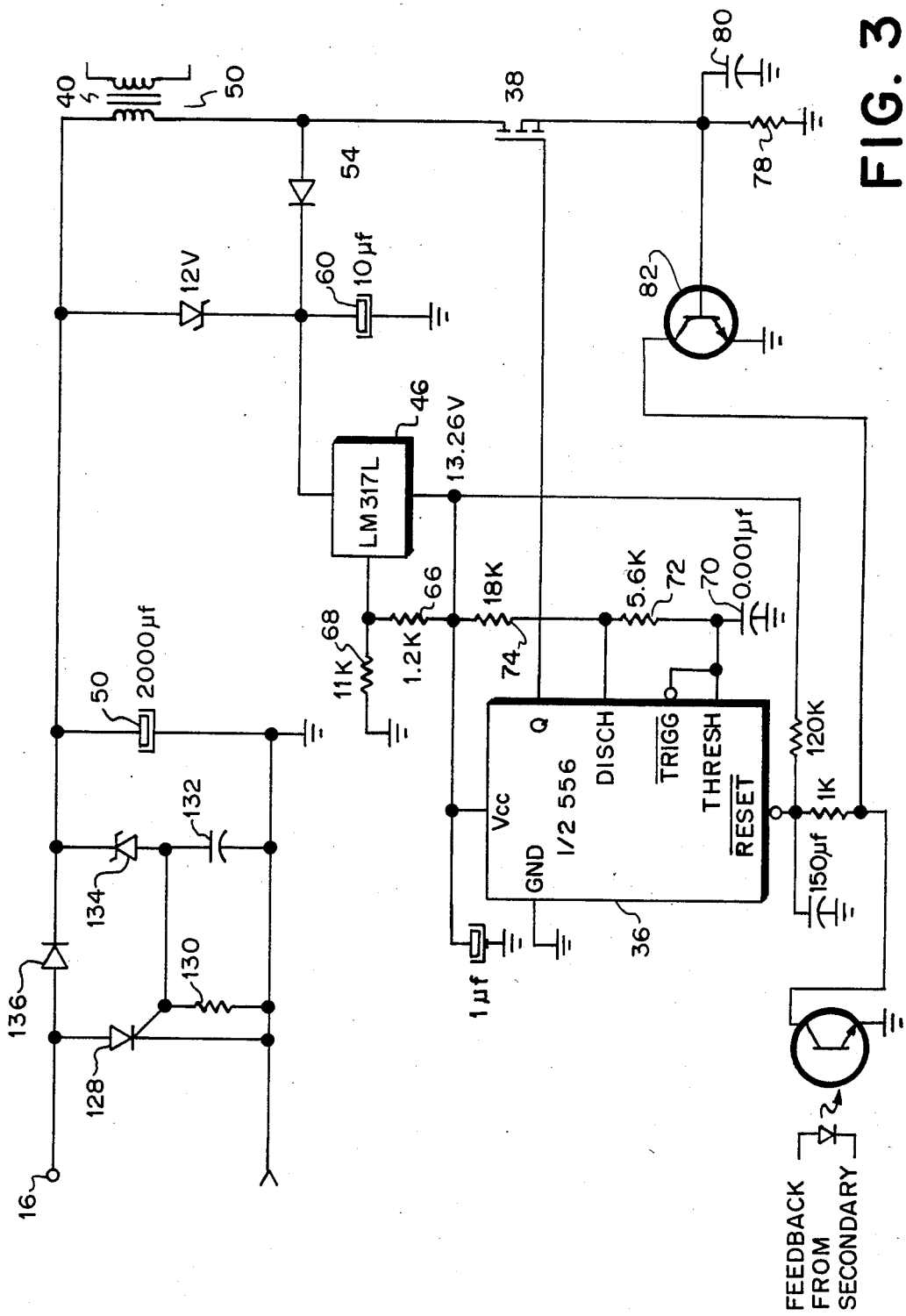
FIG. 3 is a schematic circuit diagram of an alternate embodiment of the isolating switching power supply system shown in FIG. 2.

Reference is now made to FIG. 3. FIG. 3 shows a switching power supply similar to that shown in FIG. 2; however, the feedback network rather than feeding back to the trigger and threshold terminal of the timer device terminals is fed back to the reset terminal ($\overline{RESET}$) of the timer device 36. This provides an alternate form of feedback. The reset terminal operates in a manner previously described with the over current limiting provided by resistor 78 and transistor 82 of FIG. 2. In the operation of FIG. 3, when the reset is biased low, the voltage across capacitor 70 discharges and the timer device 36 is blocked from oscillation so long as the reset terminal is maintained low. When the reset terminal is released, the timer device 36 again resumes oscillation as the voltage builds up across capacitor 70. It should be noted, that with this form of reset, capacitor 70 is fully discharged and the first cycle of the timer device 16 after the reset terminal is released may be of longer duration as compared to the arrangement in FIG. 2.

In the embodiment shown in FIG. 3, a over voltage circuit 126 is provided at the input terminal 16.

The over voltage protection circuit includes a SCR silicon controlled rectifier 128 connected between terminal 16 and ground with a resistor 130 and capacitor 132 connected to the gate electrode of silicon control rectifier 128. A zener diode 134 is biased into conduction if the input voltage exceeds +42 volts. This applies a trigger voltage to the gate electrode of the silicon controlled rectifier 128 biasing the device into conduction and short circuiting the voltage at terminal 16. The silicon controlled rectifier 128 will remain in conduction until the anode of the device is no longer forward biased by a voltage established at the input terminal 16. Diode 136 prevents discharge of energy storage capacitor 50 when the SCR 128 is biased into conduction.

While the invention has been disclosed and described with reference to a single embodiment thereof, it will be apparent, as noted above, that variations and modifications may be made therein. It is, thus, intended in the following claims to cover each variation and modification as falls within the true spirit and scope of the present invention.

What is claimed is:

1. In an electronic postage meter having means for printing postage and accounting means for accounting for postage printed by said printing means, secure housing means for protecting said printing means and said accounting means, a source of operating potential external to said secure housing means, a system for energizing said accounting means mounted within said secure housing means, comprising:

a transformer having a primary winding and a secondary winding, said primary winding coupled to said source of operating potential;

a three terminal switching device having a first and second electrode and a control electrode, said first and second electrode current path coupled to said primary winding of said transformer to control the current flow through said primary winding;

a timer circuit having a first terminal means and second terminal means, said timer first terminal means adapted to oscillate at a frequency depending on the voltage applied to said timer circuit second terminal means, said timer circuit first terminal means coupled to said three terminal control device control electrode; and a feedback circuit means coupled between said transformer primary and secondary windings and said timer circuit second terminal means for varying the voltage applied to said timer circuit second terminal means to turn the timer circuit on or off depending upon the voltage level developed in said transformer secondary winding, said feedback circuit means including a regulator circuit means coupled between said primary winding of said transformer and said timer circuit second terminal means for providing a regulated voltage level feedback.

2. A system as defined in claim 1 wherein said regulator circuit means comprises an operating voltage terminal means for energizing said regulator circuit means, said regulator circuit means operating voltage terminal means coupled to said primary winding of said transformer.

3. A switching power supply as defined in claim 1 wherein said feedback circuit comprises an opto-coupler to provide isolation between said secondary winding and the primary winding of said transformer.

4. A switching power supply as defined in claim 2 wherein said feedback circuit further comprises a circuit coupled between said opto-isolator circuit and said timer circuit second terminal for turning the timing circuit off depending upon an output signal from the opto-isolator circuit.

5. A switching power supply as defined in claim 1 wherein said timer circuit is an integrated circuit timer device.

6. A switching power supply as defined in claim 1 wherein said regulator circuit means includes an operating voltage terminal adapted to be energized by a source of operating potential, said operating voltage terminal coupled to the primary winding of said transformer.

7. A power supply as defined in claim 6 wherein said primary winding of said transformer and said secondary winding of said transformer are poled such that during operation said secondary winding of said second transformer includes a voltage in said primary winding of said transformer which is of the same polarity as and is additive to the voltage applied to said primary winding of said transformer such that a voltage is established across said primary winding of said transformer in excess of the voltage level from said source of operating potential.

8. In an electronic postage meter having means for printing postage and accounting means for accounting for postage printed by said printing means, secure housing means for protecting said printing means and said accounting means, a source of operating potential external to said secure housing means, a system for energizing said accounting means mounted within said secure housing means, comprising:

a transformer having a primary winding and a secondary winding, said primary winding coupled to said source of operating potential;

a three terminal switching device having a first and a second electrode and a control electrode, said three terminal switching device first electrode coupled to said primary winding of said transformer, and said second terminal of said three terminal switching device coupled to a point of fixed reference potential;

an integrated circuit timer device including an output terminal providing an oscillating output voltage, a terminal adapted to be energized by a source of operating potential for said device and terminal means for; turning the timer device on or off dependent upon the voltage level of the oscillating output voltage;

a voltage regulator means coupled between said primary winding of said transformer and said timer circuit frequency oscillation terminal for providing a regulated voltage feedback level;

a rectifier means coupled to said secondary winding of said transformer for rectifying the voltage developed across said secondary winding;

a source of reference potential;

a comparator amplifier means having an output terminal and a first and second input terminals, said first input terminal coupled to said rectifier means and said second input terminal coupled to a reference potential; and isolator circuit means coupled between said comparator output terminal and said device terminal means such that the frequency of oscillation at said device output terminal is determined by the voltage developed at said comparator amplifier means output terminal.

9. A system as defined in claim 8 including a device coupled between said isolator circuit means and said device terminal means for turning the timer circuit off depending upon an output signal from the isolator circuit means.

10. A system as defined in claim 9 wherein said device terminal means comprises a trigger terminal and a threshold terminal.

11. A system as defined in claim 10 wherein said device terminal means is a reset terminal.

12. In an electronic postage meter having means for printing postage and accounting means for accounting for postage printed by said printing means, secure housing means for protecting said printing means and said accounting means, a source of operating potential external to said secure housing means, a system for energizing said accounting means mounted within said secure housing means, comprising:

a transformer having a primary winding and a secondary winding, said primary winding coupled to said source of operating potential;

a source of fixed reference potential;

an MOS type transistor having a source, drain and gate electrode, said source-electrode current path coupled in series with said primary winding of said transformer, and one of said drain and source electrodes coupled to a said point of fixed reference potential;

an integrated circuit timer device having an output terminal, a trigger terminal and a threshold terminal, said output terminal coupled to said MOS transistor gate electrode;

a rectifier circuit for rectifying alternating current to direct current coupled to said secondary winding of said transformer;

means coupled to said rectifier means for establishing a reference potential;

a comparator amplifier means having a first and second input terminal and an output terminal, said first input terminal coupled to said rectifier means, said second input terminal coupled to said reference potential establishing means;

a second source of fixed reference potential; a light emitting diode;

a transistor having a collector electrode, an emitter electrode and a base electrode, said base electrode coupled to said comparator amplifier means output terminal, said collector-emitter electrode current path coupled in series with said light emitting diode between said rectifier means and said second source of fixed reference potential;

regulator circuit means for providing a regulated voltage level, said regulator circuit means comprises an input terminal adapted to be energized by an unregulated source of operating potential and an output terminal, said input terminal coupled to said primary winding of said transformer; and a phototransistor coupled to said optical light emitting diode to be biased into and out of conduction depending upon the light emanating from said light emitting diode, said photo-transistor having a collector electrode and an emitter electrode, said collector electrode coupled to said output terminal of the regulator circuit means, said emitter electrode coupled to said integrated circuit timer device trigger and threshold terminals.

13. A switching power supply system as defined in claim 12 wherein said integrated circuit timer device further comprises a reset terminal and, including a resistor coupled in series between said MOS transistor drain electrode and said first source of fixed reference potential, a transistor having a collector, emitter and base electrode, said collector-emitter electrode current path coupled between said integrated circuit timer device reset terminal and said first source of fixed reference potential said base electrode coupled to the junction of said MOS transistor drain electrode and said resistor.

* * * * *